March 6, 1962     A. E. KOLBE     3,023,846
INTERNAL COMBUSTION ENGINE LUBRICATING SYSTEM
Original Filed Oct. 1, 1959     9 Sheets-Sheet 1

INVENTOR
Adelbert E. Kolbe
BY
D. D. McGraw
ATTORNEY

INVENTOR.
Adelbert E. Kolbe
BY
ATTORNEY

March 6, 1962  A. E. KOLBE  3,023,846
INTERNAL COMBUSTION ENGINE LUBRICATING SYSTEM
Original Filed Oct. 1, 1959  9 Sheets-Sheet 6

INVENTOR.
Adelbert E. Kolbe
BY
D. D. McGraw
ATTORNEY

March 6, 1962 A. E. KOLBE 3,023,846
INTERNAL COMBUSTION ENGINE LUBRICATING SYSTEM
Original Filed Oct. 1, 1959 9 Sheets-Sheet 8

INVENTOR.
BY Adelbert E. Kolbe
D. D. McGraw
ATTORNEY

March 6, 1962     A. E. KOLBE     3,023,846
INTERNAL COMBUSTION ENGINE LUBRICATING SYSTEM
Original Filed Oct. 1, 1959     9 Sheets-Sheet 9

INVENTOR.
Adelbert E. Kolbe
BY
D. D. McGraw
ATTORNEY

United States Patent Office 3,023,846
Patented Mar. 6, 1962

3,023,846
INTERNAL COMBUSTION ENGINE LUBRICATING SYSTEM
Adelbert E. Kolbe, Berkley, Mich., assignor to General Motors Corporation, Detroit, Mich., a corporation of Delaware
Original application Oct. 1, 1959, Ser. No. 843,811. Divided and this application Aug. 22, 1960, Ser. No. 51,020
1 Claim. (Cl. 184—6)

This application is a division of application S.N. 843,811 filed October 1, 1959 in the name of Adelbert E. Kolbe.

This invention relates to lubricating systems for internal combustion engines, particularly to light weight, low cost engines for automotive and other purposes.

The invention may be embodied in a 180° opposed cylinder engine having a crankcase supporting housings at each end that contain the accessory devices employed in operating the engine. One of these housings receives an end of the crankshaft of the engine and from which the lubricating pump of the engine is driven. The lubricating pump is built into one of the housings in such a way as to be accessible from the outside of the housing. The pump circulates oil throughout passages in the housing which are adapted to communicate with passages in the crankcase and elsewhere throughout the engine, and from which the principal working parts of the engine are lubricated. The passages in the housing circulate oil to various accessory devices supported by the housing and employed in operating the engine. The housing is sealed with respect to the crankcase and the various accessory devices are sealed with respect to the housing and the crankcase so that the communicating passages formed in the different engine parts may be sealed with respect to the exterior of the engine and to one another. Certain of these passages are formed partly in different parts of the engine to facilitate manufacture of the engine and so that the different accessory devices and the various parts thereof may be easily manufactured and assembled and serviced.

In the drawings:

FIGURE 4 is a cross-sectional view illustrating one of the end housings embodied in the engine disclosed by FIGURES 1 and 2. FIGURE 4 shows the inside surface of the housing with various parts of the structure broken away to better illustrate the internal construction thereof. FIGURE 4 is taken substantially in the plane of line 4—4 on FIGURE 1, looking in the direction of the arrows.

FIGURE 5 is a fragmentary cross-sectional view illustrating one side of the end of the engine to which the housing illustrated by FIGURE 4 is secured. FIGURE 5 is taken substantially in the plane of line 5—5 on FIGURE 1, looking in the direction of the arrows.

FIGURE 6 is a fragmentary cross-sectional view of the inlet leading to the lubricating oil pump of the engine as the inlet might appear in the plane of line 6—6 on FIGURE 5, looking in the direction of the arrows.

FIGURE 7 is a cross-sectional view through the lubricating oil pump embodied in the structure disclosed by FIGURE 4. FIGURE 7 is taken substantially in the plane of line 7—7 on FIGURE 4, looking in the direction of the arrows.

FIGURE 8 is a cross-sectional view in a different plane of the lubricating oil pump embodied in the structure disclosed by FIGURE 4. FIGURE 8 is taken substantially in the plane of line 8—8 on FIGURE 4, looking in the direction of the arrows.

FIGURE 9 is a cross-sectional view through the pressure relief valve for the pump embodied in the structure disclosed by FIGURE 4. FIGURE 9 is taken substantially in the plane of line 9—9 on FIGURE 4, looking in the direction of the arrows.

FIGURE 10 is a fragmentary view illustrating an oil metering jet for lubricating the drive means for the accessory and other devices embodied in the crankcase of the engine and in the housing disclosed by FIGURE 4. FIGURE 10 is taken substantially in the plane of line 10—10 on FIGURE 4, looking in the direction of the arrows.

FIGURE 11 is a fragmentary cross-sectional view through the accessory housing disclosed by FIGURE 4, and particularly illustrating the oil filter and the association thereof with the lubricating system of the engine. FIGURE 11 is taken substantially in the plane of line 11—11 on FIGURE 4, looking in the direction of the arrows.

FIGURE 12 is a cross-sectional view through the oil filter mounter bracket embodied in the structure disclosed by FIGURE 11. FIGURE 12 is taken substantially in the plane of line 12—12 on FIGURE 11, looking in the direction of the arrows.

FIGURE 13 is another fragmentary cross-sectional view through the accessory housing, the filter mounting bracket and a part of the crankcase of the engine. FIGURE 13 is taken substantially in the plane of line 13—13 on FIGURE 4, looking in the direction of the arrows.

FIGURE 14 is a fragmentary cross-sectional view illustrating a part of the means for lubricating the crankshaft and camshaft of the engine. FIGURE 14 is taken substantially in the plane of line 14—14 on FIGURE 1, looking in the direction of the arrows.

FIGURE 16 is a cross-sectional view of the engine illustrating the lubrication of the camshaft driving means for the engine. FIGURE 16 is taken substantially in the plane of line 16—16 on FIGURE 1, looking in the direction of the arrows.

FIGURE 17 is a fragmentary cross-sectional view illustrating the oil return to the crankcase from the means for lubricating the drive means for the camshaft of the engine. FIGURE 17 is taken substantially in the plane of line 17—17 on FIGURE 16, looking in the direction of the arrows.

Figure 1:
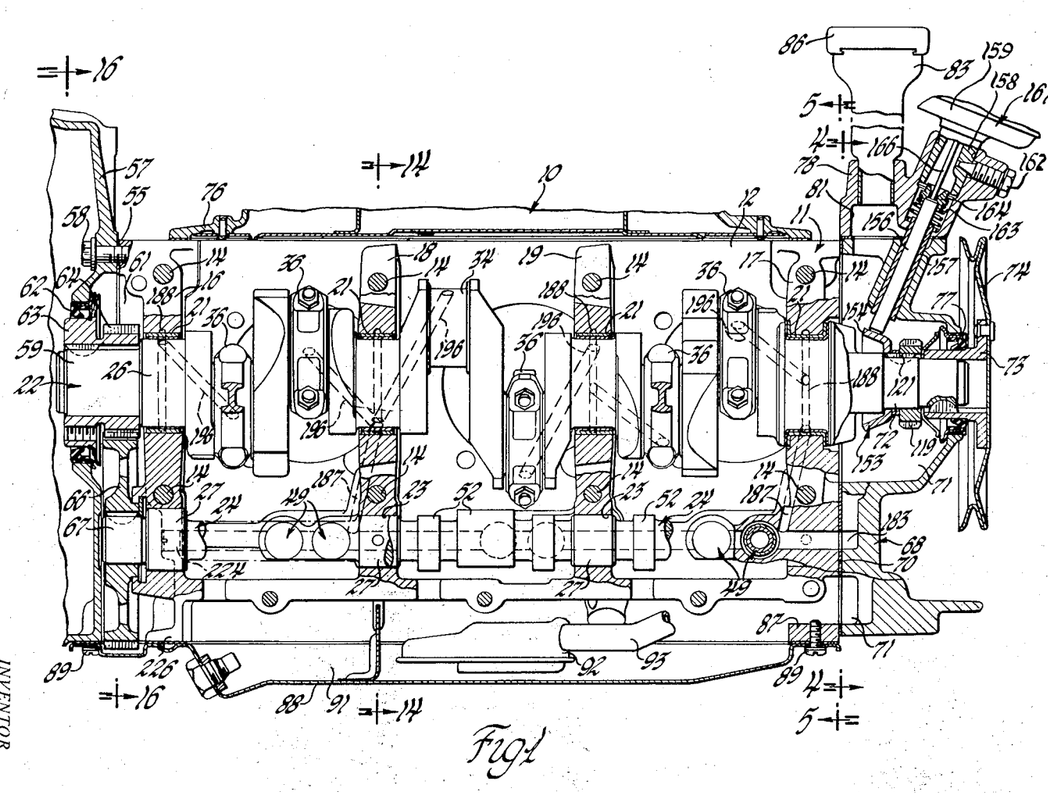
FIGURE 1 is a fragmentary longitudinal sectional view of a 180° opposed cylinder air cooled internal combustion engine having a lubricating system embodying the principles of the invention.
Figure 2:
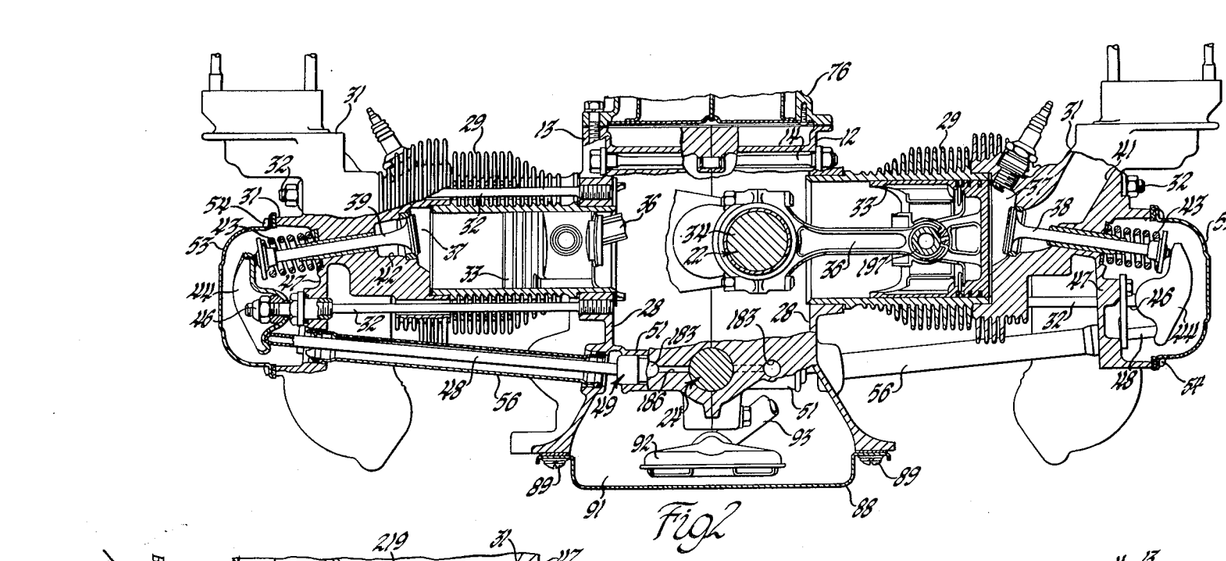
FIGURE 2 is a cross-sectional view of the engine disclosed by FIGURE 1.

The engine 10 embodying the invention has a crankcase 11 including crankcase sections 12 and 13 secured together by bolts 14. The crankcase sections 12 and 13 have sectional end walls 16 and 17 and sectional intermediate walls 18 and 19 and between which bearings 21 for the crankshaft 22 and bearings 23 for the camshaft 24 of the engine are formed. The crankshaft has journals 26 supported by the bearings 21 and the camshaft 24 has journals 27 supported by the bearings 23.

Figure 3:
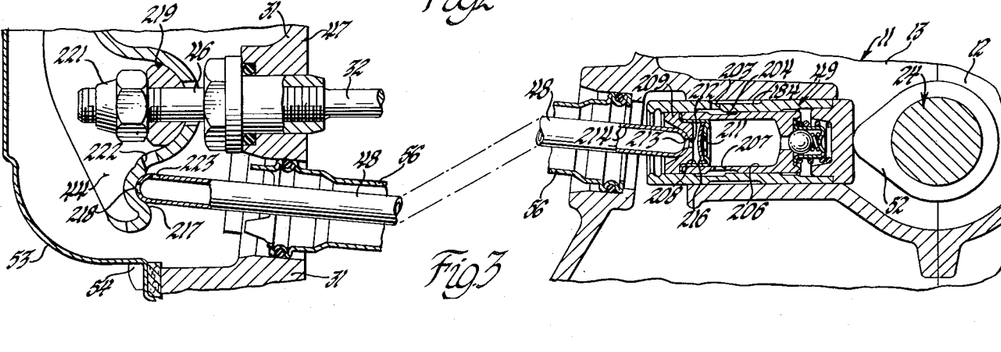
FIGURE 3 is an enlarged fragmentary view of one of the valve actuating mechanisms of the engine.

The crankcase 11 has side walls 28 having rows of cylinder openings formed therein and adapted to receive engine cylinders 29. The cylinders 29 in each row have heads 31 which are secured to the cylinder and the cylinders to the side walls of the crankcase by bolts 32. The cylinders 29 have reciprocating pistons 33 therein which are secured to the crankarms 34 of the crankshaft 22 by connecting rods 36. The cylinders 29 and heads 31 are formed to provide combustion chambers 37 controlled by inlet valves 38 and exhaust valves 39, the inlet valves 38 controlling inlet passages 41 and the exhaust valves 39 controlling exhaust passages 42 which are formed in the heads 31 of the engine. The valves 38 and 39 are adapted to be closed by valve springs 43 and opened by rocker arms 44 embodied in the valve actuating mechanism for controlling the operation of the different cylinders of the engine. The rocker arms are supported on rocker arm supports 46 which in the present instance are mounted in outer walls 47 of the heads 31 and which threadably engage certain of the bolts 32 for securing the head and the cylinders to the crankcase of the engine. The rocker arms 44 are actuated by push rods 48 which are in turn actuated by valve lifters 49 that are mounted in bosses 51 which are formed in the crankcase 11 of the engine in such position that the valve lifters will be engaged by the cams 52 on the camshaft 24 of the engine. The heads 31 have valve actuating mechanism covers 53 secured to the heads by bolts 54. The push rods 48 also have valve actuating mechanism covers in the form of push rod conduits 56. The conduits 56 extend between openings in the heads and openings in the crankcase so that the crankcase and the compartments containing the rocker arms 44 may communicate around each of the push rods 48.

Figure 16:
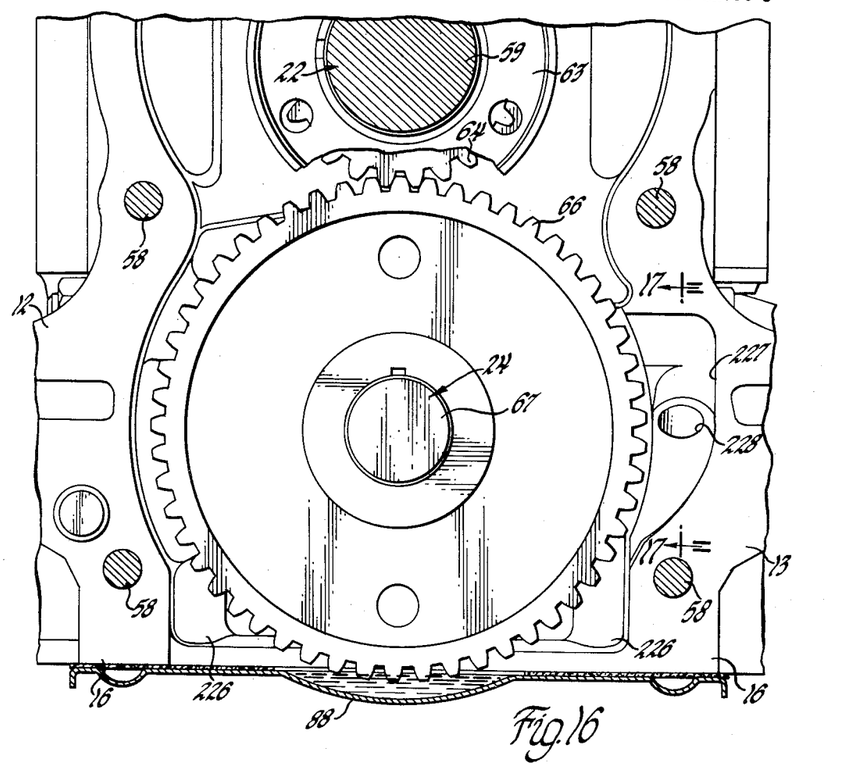

The end wall 16 of the crankcase 11 is adapted to have a clutch and drive gear housing 57 secured thereto by bolts 58. The housing 57 is sealed against the end wall 16 by a gasket 55. The crankshaft 22 has an end 59 extending beyond the wall 16 of the crankcase 11 and through a cavity 61 formed in the engine between the crankcase 11 and the housing 57. A seal 62 in an opening formed in the housing 57 is adapted to engage a hub 63 on the crankshaft end 59 for sealing the cavity 61. The hub 63 may have a clutch or other suitable device secured thereto and by which the engine 10 may be employed in driving a motor vehicle or other device. The inner part of the hub 63 within the cavity 61 is formed to provide a drive gear 64 for driving another gear 66 in the cavity 61 and secured to an end 67 of the camshaft 24 that projects within the cavity 61. The crankshaft 22 drives the camshaft 24 through the gears 64 and 66 in the cavity 61.

Figure 4:
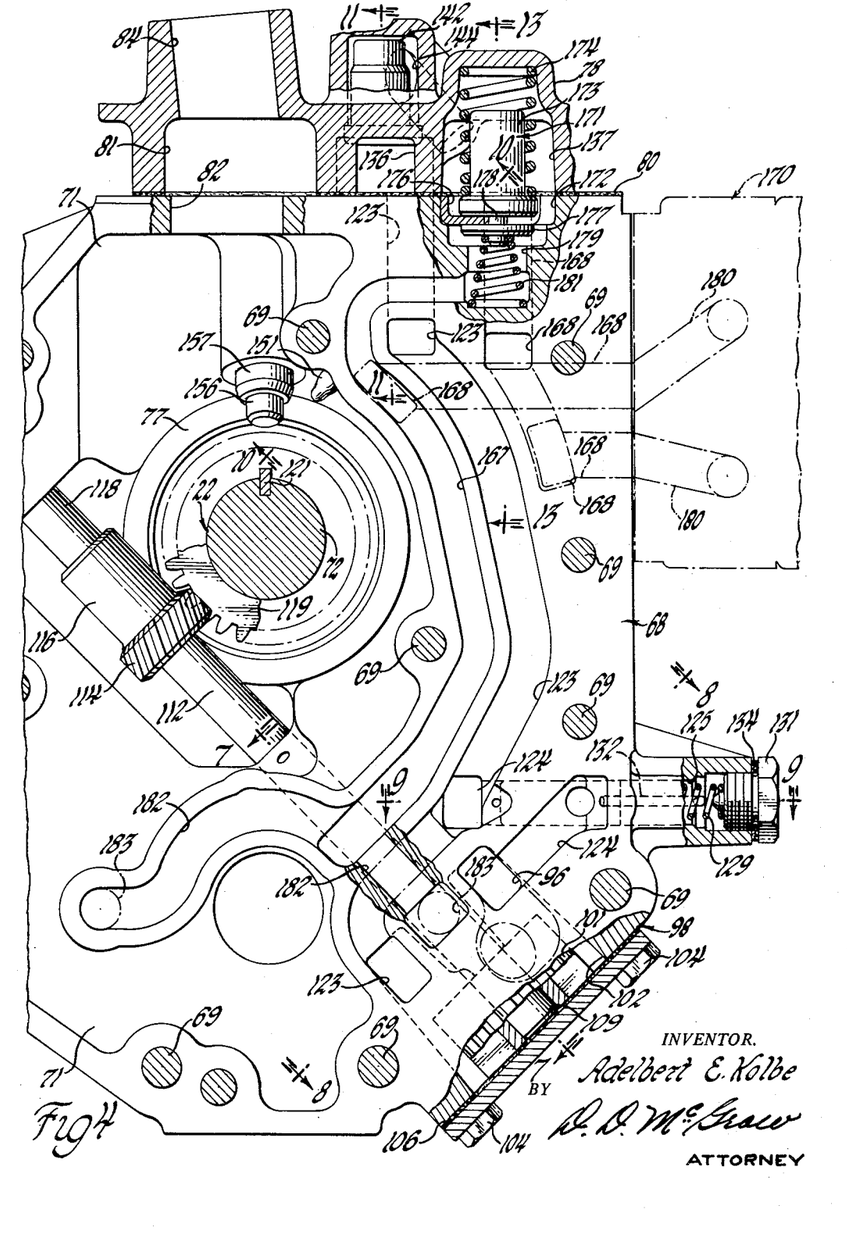
Figures 5, 6:
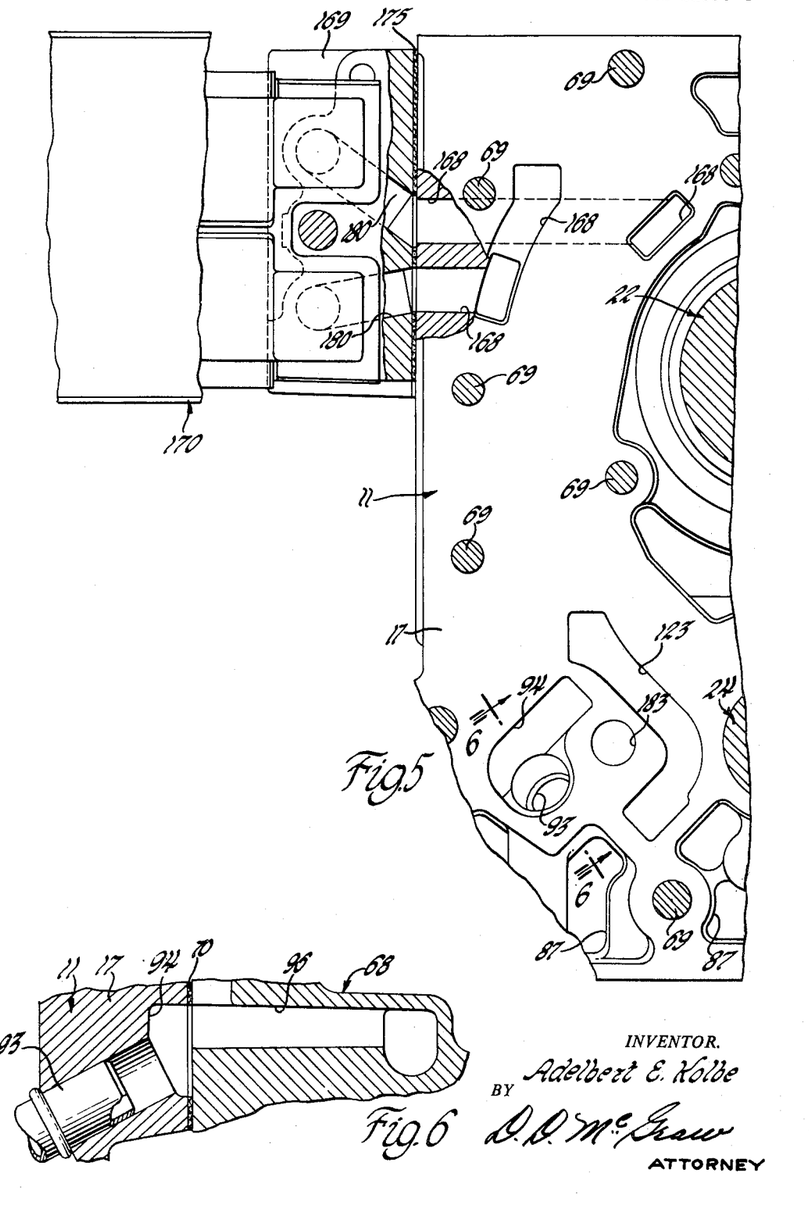

The opposite end of the crankcase 11 has a housing 68 secured to the end wall 17 by bolts 69. The housing 68 is sealed against the end wall 17 by a gasket 70. The housing 68 and the end wall 17 of the crankcase 11 are also formed to provide a cavity 71 in which the other end 72 of the crankshaft 22 projects. The outer part of the end 72 supports a hub 73 having a drive pulley 74 secured thereon and which may be employed for driving various accessory devices for the engine. One of these devices may be a blower mounted on an upper wall 76 of the crankcase 11 and employed in circulating air over the fins formed on the cylinders 29 and the heads 31 for cooling the engine. The hub is engaged by a seal 77 which is secured in an opening in the housing 68 and in which the hub 73 and the shaft end 72 are operatively disposed. The housing 68 has a bracket 78 which is secured to an upper surface thereof by bolts 79 and in such position that a cavity 81 in the lower part of the bracket will communicate with the cavity 71 through a passage 82 in the upper part of the housing. A gasket 80 is employed in sealing the bracket 78 to the surface of the housing 68 on which the bracket is secured by bolts 79.

An oil filler tube 83 is secured in a passage 84 leading to the cavity 81 and in a position to supply oil to the cavity 71 when the cap 86 for the filler tube 83 is removed. The lower part of the cavity 71 extends downwardly in the housing 68 to a position directly opposite the opening 87 in the wall 17 of the crankcase 11 so that the oil supplied to the cavity 71 when the cap 86 is removed will flow downwardly into the crankcase through the passage 82. The lower part of the crankcase 11 is closed by an oil pan 88 which is secured to the end walls 16 and 17 and side walls 28 by screws 89. The oil pan 88 provides a sump 91 adapted to contain the lubricating oil so supplied to the crankcase 11. The oil sump 91 contains a screened inlet 92 which is connected by a conduit 93 to a cavity 94 in the end wall 17 of the crankcase 11. The cavity 94 communicates with an inlet passage 96 in the housing 68 which terminates in an inlet port 97 for a lubricating oil pump 98 that is also disposed in the housing 68. The pump 98 in the present instance includes meshing gears 99 and 101 adapted to rotate in a cavity 102 formed in the lower part of the housing 68, the cavity being closed beyond the gears by a plate 103 secured to the housing by bolts 104. A gasket 106 secured between the plate and the housing is adapted to seal the pump 98 against leakage. The gear 101 is rotatably mounted on a shaft 107 secured in an opening through a projection 108 extending outwardly from the housing 68. The shaft 107 is pressed into the opening in the projection 108 to prevent leakage of oil around the shaft. When the plate 103 is removed, it will be possible to remove the gear 101 which is rotatably mounted on the lower end of the shaft 107. The gear 99 is pressed onto the lower end of a shaft 109 that is rotatably mounted in a bearing 111 formed in the housing 68. When the plate 103 is removed it is possible to remove the gear 99 and the shaft 109. The shaft 109 is adapted to be driven by a shaft 112 through a coupling 113 formed by the tongue and slotted ends of the two shafts. The lower end of the shaft 107 also projects into and is rotatably supported in the bearing 111. The upper end of the shaft 112 is secured in an opening formed in a gear 114 that has a hub 116 in which the lower end of a distributor shaft 118 is also secured. The gear 114 is driven by a driving gear 119 keyed at 121 to the end 72 of the drive shaft 22 of the engine. Rotation of the gears 99 and 101 by the shaft 112 in response to the rotation of the crankshaft 22 will result in a reduced fluid pressure in the inlet port 97 which will draw oil from the oil sump 91 through the inlet passage and conduit means 92 and 93, 94 and 96 and into the inlet side of the pump 98. Operation of the pump will carry the oil through the gears 99 and 101 to the outlet port 122 on the high pressure side of the pump 98. The oil under pressure from the outlet port 122 flows to the various bearings and to the surfaces of the engine that require lubrication through a series of conduit and passage means formed in the housing 68 and the crankcase 11 and other parts of the engine. Such conduit and passage means includes a passage 123 which is formed in the housing 68 and the wall 17 of the crankcase and which extends upwardly therein and to where the end of the passage terminates in the surface to which the bracket 78 is secured. The passage 123 also communicates with a bypass passage 124 formed in the housing 68 and the opposite end of which terminates in the inlet passage 96 that leads to the inlet port 97. The bypass passage 124 is controlled by a pressure relief valve 126 that is mounted in a passage 125 intersecting the passage 124. The pressure relief valve 126 includes a piston 127 normally held against a pin 128 by a spring 129 that is secured in the passage 125 by a threaded plug 131. The plug 131 may be sealed against the casing 68 by a gasket 134. The inlet side of the pump is connected to the spring or low pressure side of the piston 127 by a passage 132 extending between the passages 124 and 125. The spring 129 is so calibrated that when the pressure of the fluid in the passage 123 reaches a predetermined value the piston 127 will be pushed against the spring 129 until the passage 124 is opened from the outlet passage 123 to the inlet passage 96. This will maintain a substantially constant predetermined pressure in the outlet passage 123. The valve 126 may be removed or installed through the opening 125 in which the plug 131 is secured. The plug 131 is accessible from the exterior of the engine 10.

Figure 11:
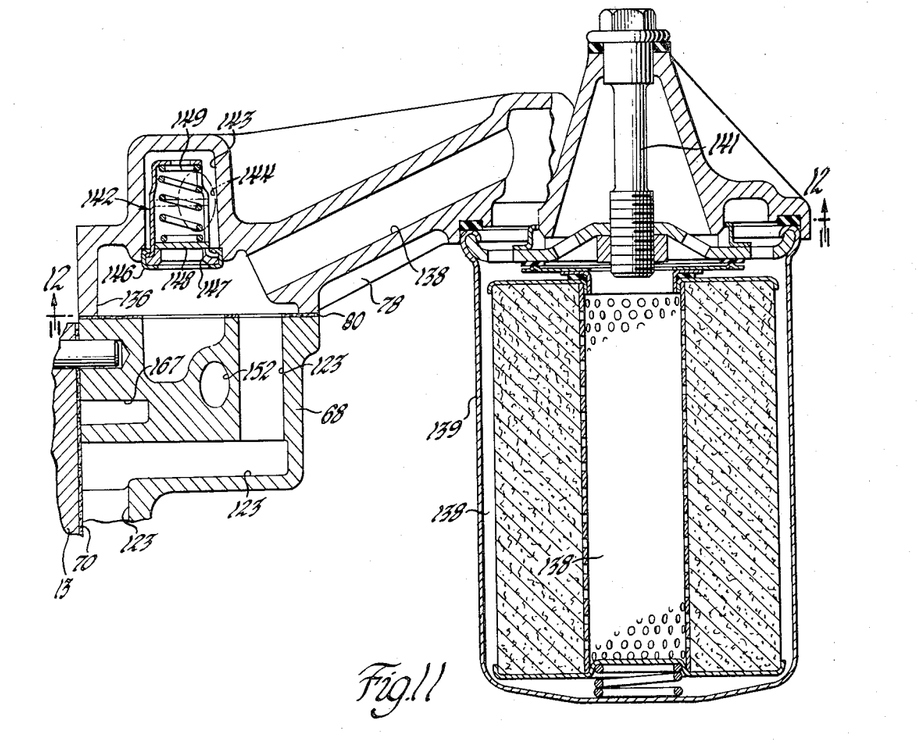
Figure 12:
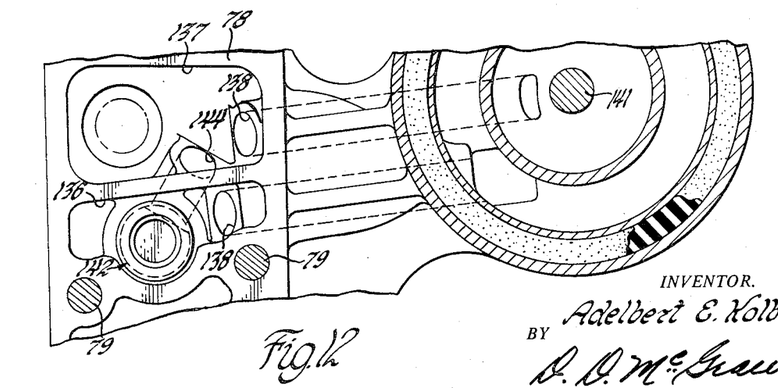

The bracket 78 is formed to provide an inlet cavity 136 with which the upper end of the passage 123 communicates. The bracket 78 is also formed to provide an outlet cavity 137 also opening into the surface on which the bracket 78 is secured. The cavities 136 and 137 are connected by a passage 138 in the bracket 78. An oil filter 139 which is secured to the bracket 78 by a bolt 141 is also included within and forms a part of the passage 138, to the end that the oil flowing through the passage 138 from the cavity 136 to the cavity 137 will be cleaned. A pressure relief valve 142 is mounted in a cavity 143 in the bracket 78 that opens outwardly from the inlet cavity 136. The cavity 143 forms a part of a by-pass passage 144 between the cavities 136 and 137. The pressure relief valve includes a perforated casing 146 which is pressed into the open end of the cavity 143 and which includes an inlet 147 controlled by a valve 148 and pressed by a spring 149 against a seat controlling the passage 147. When the resistance to flow through the filter 139 reaches a predetermined value, the valve 148 will open the bypass passage 144 between the cavities 136 and 137. The valve 142 may be removed or installed in the bracket 78 when the bolts 79 securing the bracket to the housing 68 are removed.

Figures 7, 8, 9, 10:
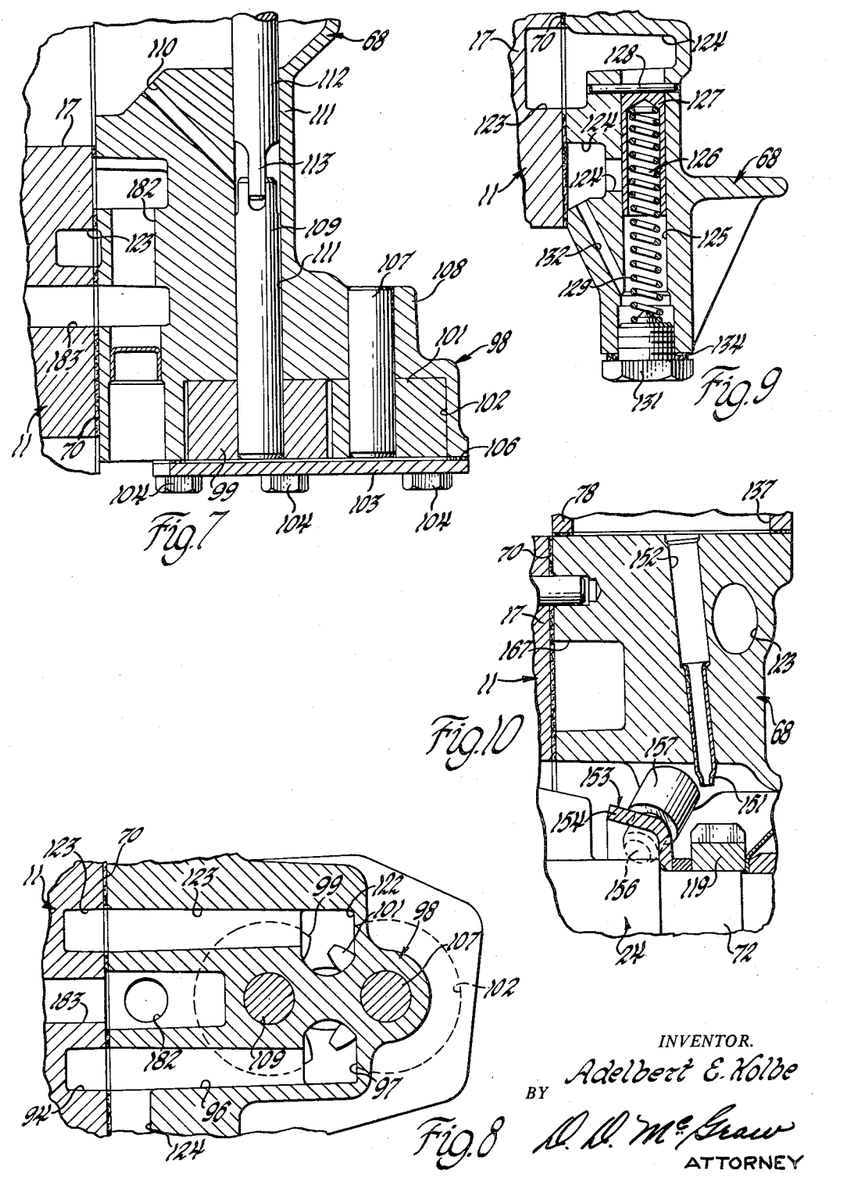

The outlet conduit and passage means for lubricating the various parts of the engine also includes a metering jet 151. The outlet cavity 137 is at all times in open communication with the metering jet 151 which is pressed into the reduced end of a passage formed in the housing 68 between the surface supporting the bracket 78 and the cavity 71 between the housing 68 and the end 17 of the crankcase 11. The reduced end of the metering jet 151 is directed toward the gear 119 which is employed in driving the pump 98. It will be apparent that rotation of the gear 119 will form a mist of the oil which will tend to lubricate all of the moving parts in the cavity 71.

One rotating part in the cavity which will be lubricated by the mist formed by the gear 119 is a fuel pump drive mechanism 153. This mechanism includes a cam 154 mounted on the crankshaft end 72 adjacent the gear 119. The cam 154 drives a plunger 156 mounted in a sleeve 157 pressed into an opening in the housing 68 which extends from the cavity 71 in the housing 68 to the cavity 81 in the bracket 78. The bracket 78 is formed to provide a socket aligned with the plunger 156 and in which the cylindrical end 158 of the casing 159 of a fuel pump 161 is secured by a screw 162. A cavity 163 beyond the end 158 of the casing 159 receives a resilient coupling 164 connecting the end of the plunger 156 with the reciprocating shaft 166 of the fuel pump 161. The mist in the cavity 71 will collect on the plunger 156 for lubricating the plunger 156 and the coupling 164 connecting the plunger 156 with the shaft 166. The mist in the cavity 71 will also collect on the seal 77 for lubricating the running contact between the seal and the hub 73. The mist in the cavity 71 also will lubricate the shafts 109 and 112 for the oil pump 98, the gear 114 driven by the gear 119 and the shaft 118 which drives the distributor for the engine 10. The coupling 113 also will be lubricated through a passage 110 by oil resulting from the mist and which may collect in a pocket 115.

Figure 13:
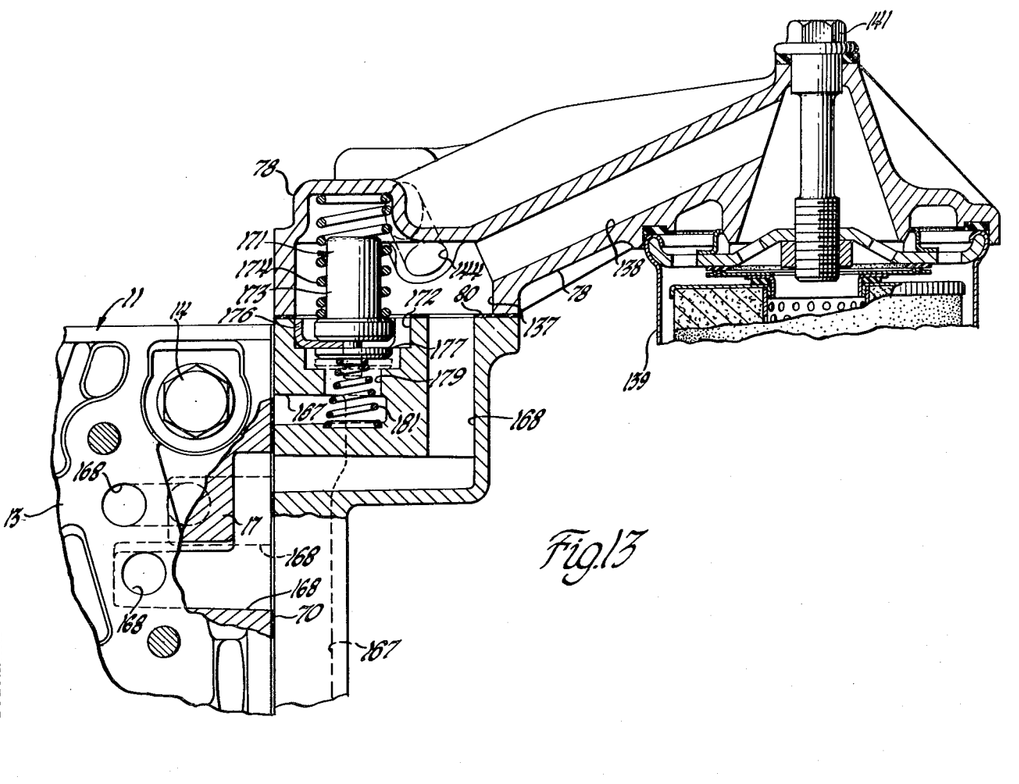

The outlet cavity 137 also communicates with a passage 167 which is formed partly within the housing 68 and partly between the housing 68 and the end wall 17 of the block 11. The passage 167 communicates with the outlet end of a bypass passage 168 formed partly within the housing 68 and partly within the end wall 17 of the block 11. The opposite end of the bypass passage 168 communicates with the passage 167. The passage 168 also has intermediate ends terminating in a surface to which an oil cooler support 169 is secured on a gasket 175 to the outer surface of one of the side walls 20 of the block 11 directly opposite the end wall 17. When the engine is started the oil from the outlet cavity 137 normally tends to flow into and through the passage 167 but this may be prevented by a thermostatically actuated temperature control valve indicated at 171. The valve 171 is located partly in the cavity 137 and partly in a cavity 172 in the surface of the housing 68 to which the bracket 78 is secured. The control valve 171 has a thermostatic element 173 which is held by a spring 174 against a perforated support or spider 176 which is pressed into the upper enlarged part of the cavity 172. When the oil flowing through the cavity 137 becomes heated to a predetermined value the capsule or element 173 will expand to move a valve 177 secured on a shaft 178 that projects from the element 173 through a centrally disposed opening in the spider 176. When the valve 177 is moved far enough it will be apparent that it will close the orifice 179 which forms a part of the communication between the cavity 137 and the passage 176. A spring 181 may be disposed in an enlarged part of the passage 176 adjacent the orifice 179 and may be compressed between the housing 68 and the valve 179. The spring 181 will tend to open the valve 177 whenever the temperature of the oil in the cavity 137 cools the elements 173 sufficiently to permit opening of the valve. When the valve 177 is closed on the orifice 179 it will be apparent that the oil from the cavity 137 will be compelled to flow through the bypass passage 168 and through the passage 180 in the oil cooler 170 which communicates with the ends of the bypass passage 168 that terminate in the surface supporting the oil cooler 170.

Figure 14:
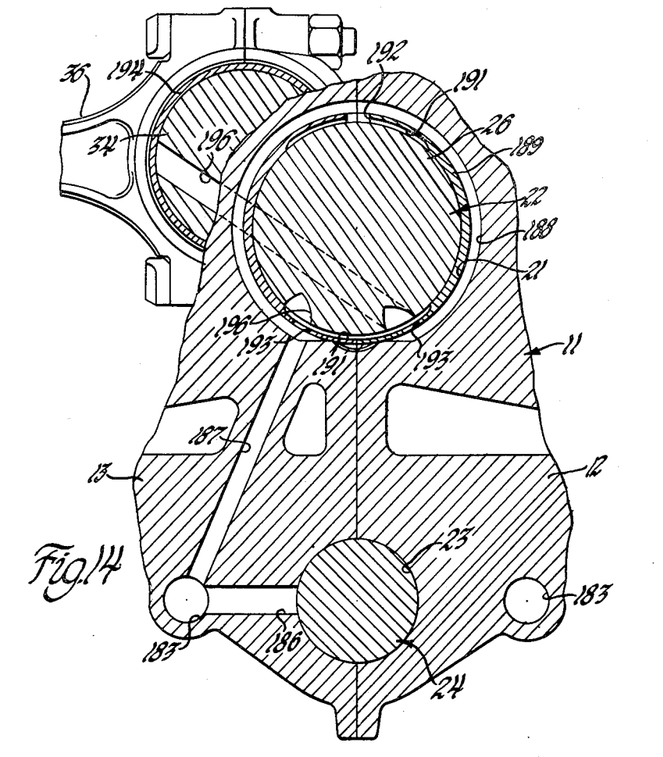

The lower end of the passage 167 is formed in the housing 68 to provide branch passages 182 which communicate with a pair of parallel oil galleries 183, the ends of which open through the wall 17 of the block 11. The oil galleries 183 extend through the bosses 51 supporting the valve lifters 49 and the various webs between the bosses and the transverse walls 16, 17, 18 and 19 of the crankcase 11. The passages 183 intersect the valve lifters 49 but the valve lifters 49 have circumferential recesses 184 which cause the passages 183 to continue around the valve lifters 49. One of the passages 183 communicates through passages 186 and 187 respectively with alternate bearings 23 of the camshaft 24 and with alternate bearings 21 of the crankshaft 22 and the other passage 183 similarly communicates with the other alternate bearings of the camshaft 24 and the crankshaft 22. The passages 186 simply terminate in the bearings 23 for the camshaft 24. However, the passages 187 terminate in arcuate grooves 188 that extend around the bushings 189 embodied in the bearings 21 for the crankshaft 22. The bushings are constructed to provide arcuate internal grooves 191 at the upper and lower parts thereof, as illustrated in FIGURE 14. The grooves 191 at the upper parts of the bearings communicate with the grooves 188 through the passages 192 while the grooves 191 in the lower parts of the bushings communicate with the grooves 188 through passages 193. With this construction it will be apparent that the parts of the bushings 189 between the inner grooves 191 will support the largest loads imposed on the crankshaft by the operation of the pistons of the engine and that these parts will be lubricated from the grooves 191 by rotation of the journals 26 of the crankshaft 21. The bearings 194 for the connecting rods 36 will be lubricated by obliquely disposed passages 196 that are formed in the crankarms supporting the crankpins 34. The pasages 196 slope with respect to the crankarms so that the ends of the pasages which terminate in the main bearing bushings 189 form acute angles with respect to the grooves 191 on the sides of the bushings 189 toward which the crankarms rotate on the inward stroke for each of the pistons of the engine. This will cause the obliquely disposed ends of the passages 196 to tend to scoop the oil from one of the passages 196 when the pistons are moving in one direction.

Figure 15:
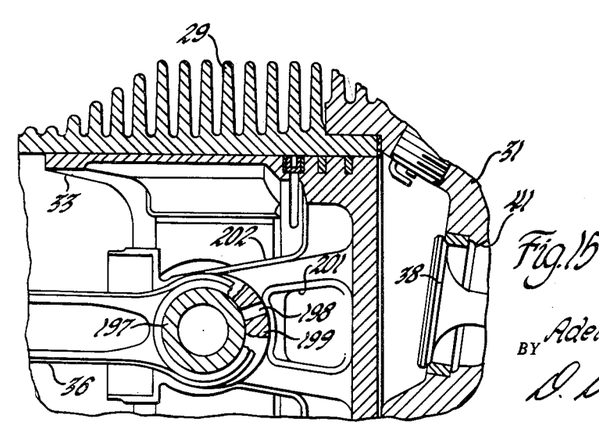
FIGURE 15 is a fragmentary cross-sectional view of one of the cylinders of the engine and illustrating the lubrication of the piston pins of the engine.

The pistons 33 are lubricated by oil thrown out of the connecting rod and main bearings of the engine and which collects upon the inner walls of the cylinders 29. The wristpins 197 for the pistons are lubricated by openings 198 in the wristpin bearings 199 of the pistons 33. The mist in the crankcase and resulting from the oil thrown out of the main and connecting rod bearings of the engine also tend to collect in pockets 201 between the piers 202 supporting the wristpin bearings 199 and from which the oil will flow into the passages 198.

The valve lifters 49 are lubricated by the oil in the circumferential grooves 184. The grooves 184 supply oil through radial passages 203 to inner circumferential passages 204 formed in the valve lifters 49. The valve lifters also have cavities or chambers 206 therein which are also supplied through radial passages 207 with oil from the passage 204. Receptacles 208 secured in the valve lifters 49 by the sockets 209 have openings 211 therein which are adapted to communicate with openings 212 in the sockets 209 that in turn communicate with openings 213 in the ends of the push rods 48 engaging the sockets 209. The push rods are hollow push rods thereby providing passages 214 therein that extend from one end to the other of the push rods. Meter valves 216 are disposed between the receptacles 208 and the adjacent surface of the sockets 209. There is some space for movement of the valves 216 between the receptacles 208 and the sockets 209 thereby causing the valves to engage first the receptacles and then the sockets. This periodically closes the passages 212 in the sockets 209 that communicate with the openings 213 and the passages 214 in the push rods 48. This tends to provide metered quantities of oil from the cavities 206 which are subject to full engine oil pressure to the passages 214 in the push rods 48. The oil in the passages 214 is adapted through openings 218 in the ends of the push rods to lubricate sockets 217 in the rocker arms 44 which are engaged by the ends of the push rods. The supports 46 for the rocker arms 44 also embody hemispherical bearings 219 that are secured to the supports 46 by nuts 221. The hemispherical bearings 219 and the surfaces of the rocker arms 44 engaged by the bearings 219 are adapted to be lubricated by passages 222 and 223 which are formed in the rocker arms 44 and the push rods 48, respectively. The passages 223 are sometimes directly opposite the passages 222, in which event jets of oil from the passages 223 will be directed on the bearings 219 through the passages 222. However, the push rods 48 tend to rotate which causes the oil to be supplied only intermittently to the bearings 219. At other times the oil from the opening 223 will simply be directed in different directions throughout the compartments containing the rocker arms 44. This oil will be formed into a mist by the operation of the valve actuating mechanism of the engine and will lubricate the stems of the valves 38 and 39, the valve springs 43 and the ends of the rocker arms 44 engaging the valve stems. The oil in the rocker arm compartments will tend to collect on the walls and flow by gravity into the lower parts of the rocker arm compartments where it then will flow into the conduits 56 which surround the push rods 48 and which connect the rocker arm compartments to the crankcase of the engine. It will be noted that the conduits 56 slope downwardly from the rocker arm compartments so that the oil will return by gravity flow through the conduits 56 to the crankcase.

The ends of te passages 183 opposite the housing 68 may be closed in any suitable manner as by employing threaded plugs indicated at 224.

Figure 17:
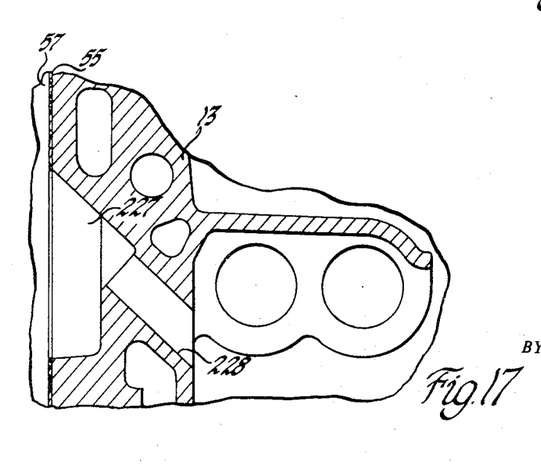

It will be noted that the cavity 61 containing the gears 64 and 66 communicates through a passage 226 in the end wall 16 with the oil sump 91 in the lower part of the crankcase 11 and the oil pan 88. The oil pan 88 continues beyond the end wall 16 and engages the lower part of the housing 57 thereby partly closing the cavity 61 between the housing 57 and the end wall 16. The passage 226 is formed at the lower extremity of the wall 16 and low enough so that oil will normally flow from the oil sump 91 into the lower part of the cavity 61 where it will be engaged by the teeth of the gear 66. The teeth of the gear 66 will tend to pick up the oil and carry it upwardly to the gear 64. The operation of the gears also will tend to cause a mist in the cavity 61 which will tend to lubricate a seal 62. It is proposed to provide an oil return for the excess oil that may be carried upwardly by the teeth of the gear 66 and into the cavity 61. For this purpose it is proposed to provide a cavity 227 in the rear wall and the housing 57 about opposite the axis of the camshaft 67 and on the side of the gear toward which the teeth of the gear rotate from the bottom of the gear upwardly. The cavity 227 is connected to the interior of the crankcase 11 by a passage 228. When the gear rotates the teeth will carry excess oil upwardly where it will be thrown out into the cavity 227 and returned to the crankcase through the passage 228.

What is claimed is:

A lubricating system for an internal combustion engine having a crankcase with a crankshaft and a camshaft mounted therein and having a housing at one end thereof with engine accessory devices associated therewith and comprising, a lubricating oil pump disposed in said housing and having an inlet in said crankcase, pump inlet passage means formed in said crankcase and said housing and leading from said inlet to said pump, pump outlet passage means formed in said housing and said crankcase and leading from said pump to the bearings for said crankshaft and said camshaft, said outlet passage means within said housing being formed to provide outlet passage means ends terminating in a surface of said housing, a bracket forming a part of said housing and engaging said surface and having cavities therein and with one of said cavities communicating with each of said ends, filter passage means formed in said bracket and communicating with said cavities, an oil filter secured to said bracket and communicating with said cavities through said filter passage means, a bypas passage formed in said bracket between said cavities, a pressure relief valve mounted in said bracket and controlling said bypass passage, means removably securing and sealing said housing to said crankcase with said inlet passage means in said crankcase registering with said inlet passage means in said housing and with said outlet passage means in said housing registering with said outlet passage means in said crankcase and with said inlet and outlet passage means in said crankcase and said housing sealed against leagage of oil between said inlet and said outlet passage means, and means removably securing and sealing said bracket to said housing surface with said ends registering with said cavities and with sad cavities and ends sealed against leakage of oil between said cavity ends, and said pressure relief valve being accessible through one of said cavities when said bracket is removed from said housing.

References Cited in the file of this patent

UNITED STATES PATENTS

| | | |
|---|---|---|
| 2,318,276 | Worthington | May 4, 1943 |
| 2,801,006 | Hultgren et al. | July 30, 1957 |